United States Patent
Kim et al.

(10) Patent No.: US 9,541,695 B2
(45) Date of Patent: Jan. 10, 2017

(54) LIGHT SOURCE DEVICE

(75) Inventors: Yun Ha Kim, Seoul (KR); Sang Hoon Lee, Seoul (KR); Hyunha Shin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/040,444

(22) Filed: Mar. 4, 2011

(65) Prior Publication Data

US 2011/0205727 A1   Aug. 25, 2011

(30) Foreign Application Priority Data

Apr. 10, 2010 (KR) .................. 10-2010-0033039
Apr. 10, 2010 (KR) .................. 10-2010-0033040

(51) Int. Cl.
F21V 8/00 (2006.01)

(52) U.S. Cl.
CPC ........... *G02B 6/0023* (2013.01); *G02B 6/0076* (2013.01); *G02B 6/0035* (2013.01); *G02B 6/0073* (2013.01)

(58) Field of Classification Search
CPC .... F21K 2/00; F21Y 2113/005; G02B 6/0068; G02B 6/0026; G02B 6/0076; G02B 6/0023; G02B 6/0035; G02B 6/0073; G02F 1/133609; F21V 9/16; F21V 9/08
USPC .................. 362/84, 217.02, 217.05, 296.02, 341,362/343, 346
See application file for complete search history.

(56) References Cited

U.S. PATENT DOCUMENTS

| | | | |
|---|---|---|---|
| 5,506,929 A * | 4/1996 | Tai et al. | 385/146 |
| 7,256,057 B2 * | 8/2007 | Schardt et al. | 438/14 |
| 7,762,704 B2 * | 7/2010 | Brychell | 362/615 |
| 7,887,206 B2 * | 2/2011 | Lee | 362/84 |
| 7,915,627 B2 * | 3/2011 | Li | 257/98 |
| 7,967,652 B2 * | 6/2011 | Emerson | 445/24 |
| 8,016,443 B2 * | 9/2011 | Falicoff et al. | 362/84 |
| 8,120,726 B2 * | 2/2012 | Suzuki et al. | 349/61 |
| 8,125,137 B2 * | 2/2012 | Medendorp et al. | 313/501 |
| 8,162,506 B2 * | 4/2012 | Wei et al. | 362/231 |
| 8,325,295 B2 * | 12/2012 | Sugita et al. | 349/65 |
| 2005/0128751 A1 * | 6/2005 | Roberge et al. | 362/276 |
| 2006/0268537 A1 * | 11/2006 | Kurihara et al. | 362/34 |

(Continued)

FOREIGN PATENT DOCUMENTS

JP    2004-031023 A    1/2004
JP    2006-108076 A    4/2006

(Continued)

OTHER PUBLICATIONS

European Communication dated Jan. 7, 2013 for Application 11 153 485.5.

(Continued)

*Primary Examiner* — Stephen F Husar
(74) *Attorney, Agent, or Firm* — KED & Associates LLP

(57) ABSTRACT

Disclosed is a light source device. The light source device includes:
   a light guide plate;
   a reflector disposed under the light guide plate;
   a light source unit optically coupled to the light guide plate; and
   a photo luminescent film disposed between the light guide plate and the light source unit, wherein the photo luminescent film includes at least two partitioned areas, and wherein a first fluorescent material included in at least one area of the at least two areas is different from a second fluorescent material included in the other areas.

17 Claims, 6 Drawing Sheets

(56) References Cited

U.S. PATENT DOCUMENTS

| | | | |
|---|---|---|---|
| 2007/0242441 A1* | 10/2007 | Aldrich et al. | 361/782 |
| 2007/0263409 A1* | 11/2007 | Mok | 362/612 |
| 2007/0285943 A1* | 12/2007 | Ouderkirk et al. | 362/609 |
| 2008/0030993 A1* | 2/2008 | Narendran et al. | 362/296 |
| 2009/0101930 A1* | 4/2009 | Li | 257/98 |
| 2009/0103293 A1* | 4/2009 | Harbers et al. | 362/231 |
| 2009/0180282 A1* | 7/2009 | Aylward et al. | 362/245 |
| 2009/0316383 A1* | 12/2009 | Son et al. | 362/84 |
| 2010/0002413 A1* | 1/2010 | Igarashi et al. | 362/84 |
| 2010/0110676 A1* | 5/2010 | Falicoff et al. | 362/235 |
| 2010/0157406 A1* | 6/2010 | Gruhlke et al. | 359/238 |
| 2010/0172120 A1* | 7/2010 | Wegh et al. | 362/84 |
| 2010/0195307 A1* | 8/2010 | Bollmann | 362/84 |
| 2010/0259924 A1* | 10/2010 | Dong | 362/231 |
| 2010/0283072 A1* | 11/2010 | Kazlas et al. | 257/98 |
| 2011/0176091 A1* | 7/2011 | Boonekamp et al. | 349/86 |
| 2011/0199787 A1* | 8/2011 | Kim et al. | 362/612 |
| 2012/0039073 A1* | 2/2012 | Tong | 362/231 |

FOREIGN PATENT DOCUMENTS

| | | |
|---|---|---|
| JP | 2007-005098 A | 1/2007 |
| JP | 2007-265716 A | 10/2007 |
| JP | 2009-211819 A | 9/2009 |
| JP | 4399678 B1 | 1/2010 |
| KR | 10-2009-0032825 | 4/2009 |
| WO | WO 2007/074787 A1 | 7/2007 |
| WO | WO 2008/060469 A2 | 5/2008 |
| WO | WO 2009136351 A1 * | 11/2009 |
| WO | WO 2010/035176 A1 | 4/2010 |

OTHER PUBLICATIONS

Extended European Search Report dated Feb. 17, 2014 for Application 13194373.0.
Japanese Office Action issued in Application No. 2011-081409 dated Dec. 2, 2014.
Korean Office Action for Application 10-2010-0033039 dated Apr. 19, 2016 (full Korean text).

* cited by examiner

LIGHT SOURCE DEVICE

The present application claims priority under 35 U.S.C. §119(e) of Korean Patent Applications Nos. 10-2010-0033039 and 10-2010-0033040 filed on Apr. 10, 2010, which is hereby incorporated by reference in its entirety.

BACKGROUND

Field

This embodiment relates to a light source device.

Description of the Related Art

In general, an electric bulb or a fluorescent lamp is commonly used as an indoor or outdoor lighting lamp. However, the electric bulb or the fluorescent lamp has a short life span, so that it should be frequently changed. Moreover, a conventional fluorescent lamp is degraded due to elapse of time for its use. As a result, it is often that its illuminance is gradually decreased.

In order to overcome such problems, a lighting apparatus is now being developed by using a light emitting device (hereinafter, referred to as LED). The LED is easy to control and has a rapid response speed, high electro-optic conversion efficiency, a long life span, low power consumption and high luminance. The LED is also used to create emotional lighting.

Light emitting device (LED) lighting is next generation lighting. Since the LED lighting uses a semiconductor device and light with a longer wavelength than that of an ultraviolet ray, it is not harmful to human body.

Therefore, many lighting apparatuses to which the LED is applied are now being developed. However, a lot of parts are required at present to create various colors or a characteristic of light which is a source of lighting, for example, a color rendering index (CRI).

SUMMARY

One aspect of this invention is a light source device. The light source device includes:
  a light guide plate;
  a reflector disposed under the light guide plate;
  a light source unit optically coupled to the light guide plate; and
  a photo luminescent film disposed between the light guide plate and the light source unit, wherein the photo luminescent film comprises at least two partitioned areas, and wherein a first fluorescent material comprised in at least one area of the at least two areas is different from a second fluorescent material comprised in the other areas.

Another aspect of this invention is a light source device. The light source device includes:
  a light guide plate;
  a reflector disposed under the light guide plate;
  a plurality of light emitting devices optically coupled to the light guide plate; and
  a photo luminescent film disposed between the light guide plate and the light source unit, wherein the plurality of light emitting devices comprise a warm white LED emitting a correlated color temperature within a range between 2,000 K and 3,000 K, and comprise a cool white LED emitting a correlated color temperature within a range between 5,500 K and 6,500 K, and wherein the warm white LED and the cool white LED are disposed in the longitudinal direction of the photo luminescent film.

Further another aspect of this invention is a light source device. The light source device includes:
  a light guide plate;
  a light source unit optically coupled to a side of the light guide plate; and
  a photo luminescent film converting a wavelength of light emitted from the light source unit and emitting the light to the light guide plate, wherein a first fluorescent material and a second fluorescent material different from the first fluorescent material are partitioned and randomly arranged in the photo luminescent film in the longitudinal direction of the photo luminescent film.

DETAILED DESCRIPTION OF THE EMBODIMENTS

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Hereinafter, an embodiment will be described in detail with reference to the accompanying drawings.

Figure 1:
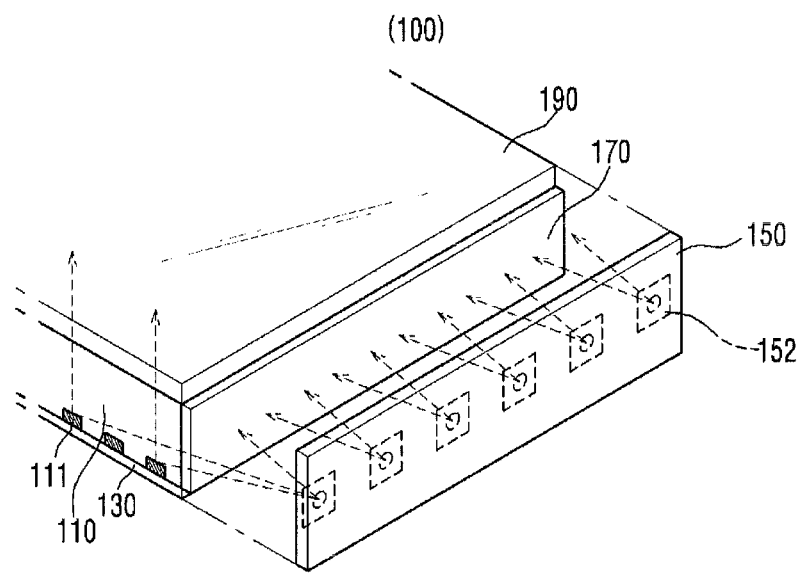
FIG. 1 is a perspective view showing a light source device according to an embodiment of the present invention.
Figure 2:
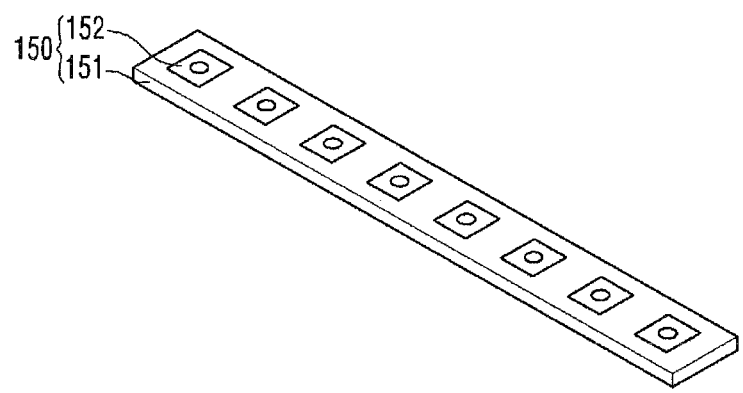
FIG. 2 is a view showing a light source unit of the light source device according to the embodiment of the present invention.
Figure 3:
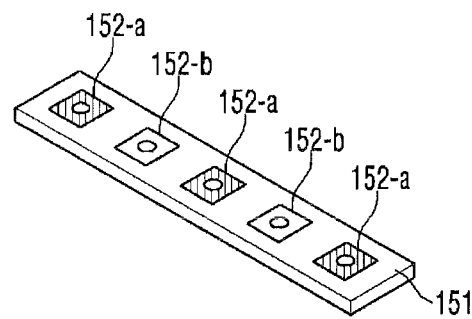
FIG. 3 is a view showing an arrangement structure of light emitting devices of the light source unit according to the embodiment of the present invention.
Figure 4:
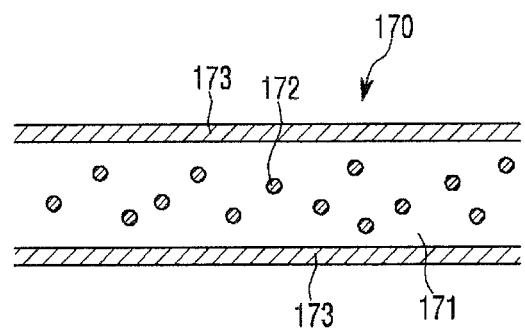
FIG. 4 is a view showing a structure of a phosphor luminescent film according to the embodiment of the present invention.

FIG. 1 is a perspective view showing a light source device according to an embodiment of the present invention. FIG. 2 is a view showing a light source unit of the light source device according to the embodiment of the present invention. FIG. 3 is a view showing an arrangement structure of light emitting devices of the light source unit according to the embodiment of the present invention. FIG. 4 is a view showing a structure of a phosphor luminescent film according to the embodiment of the present invention.

First, referring to FIG. 1, a light source device 100 includes a light guide plate 110, a reflector 130, a light source unit 150, a photo luminescent film 170, and a diffusing film 190.

The light guide plate 110 converts a point light source into a surface light source. A pattern 111 is formed on one side of the light guide plate 110 such that light incident on the inside of the light guide plate 110 is emitted to the outside. The pattern 111 functions to diffuse or scatter the light and to emit to the outside. Such a light guide plate 110 may be made of a transparent resin and may be printed by a silk screen printing method and the like.

The diffuser film 190 is disposed on the light guide plate 110. The diffuser film 190 functions to allow the light incident into the inside of the light guide plate 110 to be uniformly emitted to the outside.

The reflector 130 is disposed under the light guide plate 110. The reflector 130 prevents the light incident into the inside of the light guide plate 110 from being emitted to the rear of the light guide plate.

The light source unit 150 is disposed on the side of the light guide plate 110. Any device capable of emitting light can be used as the light source unit 150. In the embodiment of the present invention, a light emitting device is used as the light source unit. The light source unit 150 is optically coupled to the light guide plate 110, so that light generated from the light source unit 150 is incident into the inside of the light guide plate 110.

As shown in FIG. 2, the light source unit 150 includes a printed circuit board 151 and a plurality of light emitting devices 152 disposed on the printed circuit board 151. The plurality of the light emitting devices 152 are arranged in a line in the longitudinal direction of the printed circuit board. Though the plurality of the light emitting devices 152 may consist of a blue light emitting device, it is desirable that a white light emitting device with a high color rendering index (CRI) should be used as the plurality of the light emitting devices 152 if possible. The white light emitting device is formed by molding plastic including a yellow fluorescent material on a blue light emitting chip, and creates white light. Here, the plastic may include a silicon resin or an epoxy resin. The white light emitting device may further include a green fluorescent material or a red fluorescent material so as to increase the color rendering index (CRI). That is, plastic including a yellow fluorescent material is mainly molded on the blue light emitting chip, and the green fluorescent material and the red fluorescent material may be included in the plastic in the order listed. The fluorescent material may include at least one of a garnet based material, a silicate based material, a nitride based material and an oxynitride based material. Here, the garnet based material may include YAG ($Y_3Al_5O_{12}:Ce^{3+}$) material or TAG ($Tb_3Al_5O_{12}:Ce^{3+}$) material. The silicate based material may include (Sr, Ba, Mg, Ca)$_2$SiO$_4$:Eu$^{2+}$ material. The nitride based material may include CaAlSiN$_3$:Eu$^{2+}$ material. The oxynitride based material may include $Si_{6-x}Al_xO_xN_{8-x}:Eu^{2+}$ material.

Meanwhile, in the yellow, green and red fluorescent materials included in the plastic, when the ratio of the yellow fluorescent material is the highest and the ratio of the red fluorescent material is the lowest, the yellow, green and red fluorescent materials may include a garnet based material, a silicate based material and a nitride based material respectively. The yellow, green and red fluorescent materials may include a silicate based material, a silicate based material and a nitride based material respectively. The yellow, green and red fluorescent materials may include a garnet based material, an oxynitride based material and a nitride based material respectively. The yellow, green and red fluorescent materials may include an oxynitride based material, an oxynitride based material and a nitride based material respectively.

As shown in FIG. 3, the plurality of the light emitting devices 152 are comprised of a warm white LED 152-a and a cool white LED 152-b. The warm white LED 152-a and the cool white LED 152-b are alternately arranged on the printed circuit board 151. Accordingly, when light is emitted in the form of a surface light source, uniformly mixed light can be emitted from an entire light emitting surface.

While not shown, when a specific color is required to be generated locally or randomly on the light emitting surface, the warm white LED and the cool white LED may be arranged locally or randomly with the order of the LEDs on the printed circuit board.

Meanwhile, the warm white LED 152-a emits a correlated color temperature within a range between 2,000 K and 3,000 K, and has warm colors. The cool white LED 152-b emits a correlated color temperature within a range between 5,500 K and 6,500 K, and has cool colors. The warm white LED 152-a and the cool white LED 152-b per se can emit white light without a combination of a red, green and blue light emitting devices. That is, the warm white LED 152-a and the cool white LED 152-b are formed by molding plastic on the blue light emitting chip. The plastic includes a fluorescent material allowing the warm and cool white LEDs 152-a and 152-b to emit light with their corresponding correlated color temperatures. As a result, correlated color temperatures for white light can be emitted.

As such, since the warm white LED 152-a and the cool white LED 152-b emit the correlated color temperatures respectively and emit mixed white light, the color rendering index (CRI) representing a degree of being close to natural sunlight becomes higher. Therefore, an actual color of an object can be prevented from being distorted and the fatigue of the eyes of users is reduced.

The photo luminescent film 170 is disposed between the light guide plate 110 and the light source unit 150, and includes various fluorescent materials within the photo luminescent film 170. The photo luminescent film 170 changes a part of a wavelength of light emitted from the light source unit 150, and changes the color of the light.

As shown in FIG. 4, the photo luminescent film 170 includes a transparent resin 171 and a fluorescent material 172 included within the transparent resin 171. The fluorescent material may include least one of garnet based material silicate based material, a nitride based material and an oxynitride based material. Here, the garnet based material may include YAG ($Y_3Al_5O_{12}:Ce^{3+}$) material or TAG ($Tb_3Al_5O_{12}:Ce^{3+}$) material. The silicate based material may include (Sr, Ba, Mg, Ca)$_2$SiO$_4$:Eu$^{2+}$ material. The nitride based material may include CaAlSiN$_3$:Eu$^{2+}$ material. The oxynitride based material may include $Si_{6-x}Al_xO_xN_{8-x}:Eu^{2+}$ material.

A transparent protective film 173 is stacked on the transparent resin. A silicon resin is mainly used as the transparent resin. Any material having transparency can be used as the transparent resin.

While not shown, a curing agent or an additive agent may be included within the transparent resin. The curing agent cures the transparent resin. The additive agent disperses uniformly the fluorescent material within the transparent resin. A diffusing agent may be included within the transparent resin. The diffusing agent improves the refractive index of a light source, thus increasing the excitation ratio of the fluorescent material.

The transparent protective film 173 disposed on the transparent resin obtains humidity resistance and thermal resistance of the fluorescent material. The transparent protective film 173 is made of colorless and transparent plastic having high optical transmittance. However, there is no limit to the material of the transparent protective film 173. For example, the transparent protective film 173 may be made of polyethylene terephthalate (PET), polyethylene naphthalate), acrylic resin, polycarbonate and polystyrene and the like.

Figure 5:
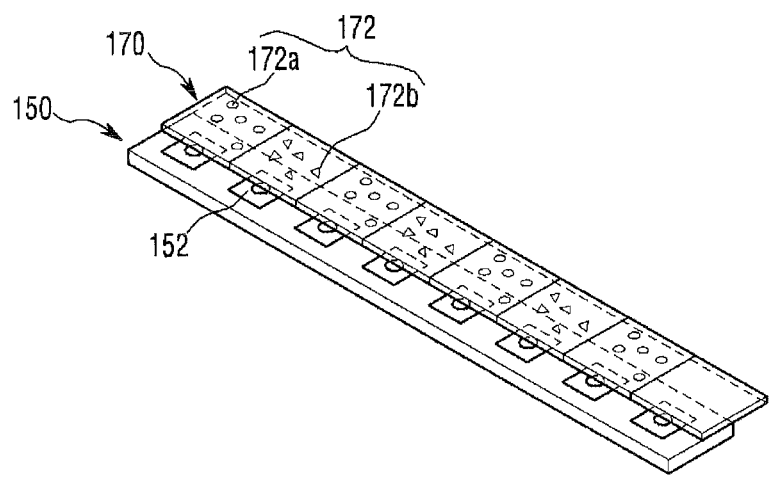
FIG. 5 is a view showing an arrangement structure of a fluorescent material included in the phosphor luminescent film according to the embodiment of the present invention and showing a structure in which the phosphor luminescent film and the light source unit are arranged.

FIG. 5 is a view showing an arrangement structure of a fluorescent material included in the phosphor luminescent film according to the embodiment of the present invention and showing a structure in which the phosphor luminescent film and the light source unit are arranged.

As shown, the transparent resin 171 of the photo luminescent film 170 includes a first area and a second area. The first area includes a first fluorescent material 172a. The second area includes a second fluorescent material 172b different from the first fluorescent material 172a. The first fluorescent material 172a and the second fluorescent material 172b are partitioned from each other in the photo luminescent film 170. A fluorescent material included in one of the first area and the second area may be different from a fluorescent material included in the other area. The first area and the second area partitioned in the photo luminescent film 170 are alternately arranged in the longitudinal direction of the photo luminescent film 170.

The first fluorescent material 172a and the second fluorescent material 172b may be arranged locally or randomly in the longitudinal direction of the photo luminescent film 170. When the first fluorescent material 172a and the second fluorescent material 172b are alternately arranged and when light is emitted through the light guide plate in the form of a surface light source, the colors of the light is uniformly mixed. As a result, various colors of the light can be created on the entire light emitting surface.

The color of light may be created depending on the color of the light emitted from a light emitting device per se. However, it is preferable that the color of light is created depending on the fluorescent material included in the photo luminescent film.

When the first fluorescent material 172a and the second fluorescent material 172b are alternately disposed, the plurality of the light emitting devices 152 of the light source unit 150 are, as shown, disposed corresponding respectively to the first fluorescent material 172a and the second fluorescent material 172b which are disposed within the photo luminescent film 170. Therefore, alignment characteristic between the plurality of the light emitting devices and the fluorescent materials is satisfactory, thus emitting light having a desired color temperature.

If the plurality of the light emitting devices have the same color temperature and create the same color, the alignment characteristic between the plurality of the light emitting devices and the fluorescent materials does not affect the characteristic of the desired color. However, when the plurality of the light emitting devices are, for example, comprised of the warm white LED and the cool white LED, and when the warm white LED and the cool white LED are alternately arranged, the alignment characteristic between the fluorescent material and the cool and warm white LEDs may deteriorate. When the alignment characteristic deteriorates, light of an adjacent cool or warm white LED may pass through the fluorescent material. Thus, there occurs a problem that light having an undesired color temperature is emitted.

Each of the first fluorescent material 172a and the second fluorescent material 172b absorbs light having a specific wavelength and being emitted from the light source unit and converts the light into light having another wavelength. Accordingly, with respect to light emitted outward, it is possible to control the first fluorescent material 172a and the second fluorescent material 172b in accordance with a desired color of light.

As such, the fluorescent material included in the photo luminescent film can change the color of emitted light, thereby creating light having various colors.

The light source device according to the embodiment of the present invention substantially reduces the number of the photo luminescent film and the number of the light guide plate, and reduces manufacturing cost. The light source device also prevents the volume of the light source device from being increased by the number of the light guide plate. As a result, a lighting device to which the light source device is applied becomes thinner.

This embodiment of the present invention includes the shortest optical path. Therefore, a luminous efficiency of this embodiment is improved.

Figure 6:
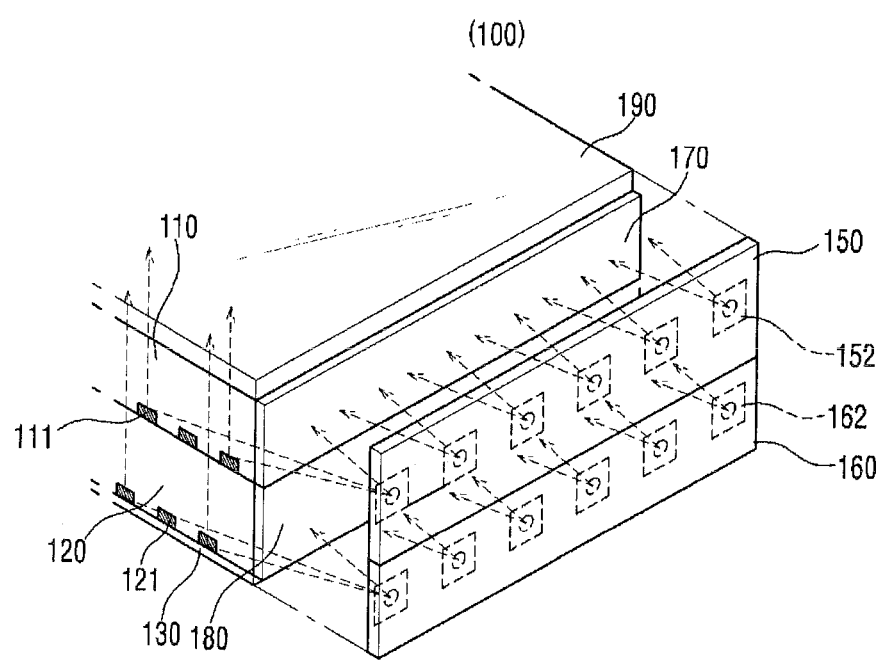
FIG. 6 is a perspective view showing another light source device according to an embodiment of the present invention.
Figure 7:
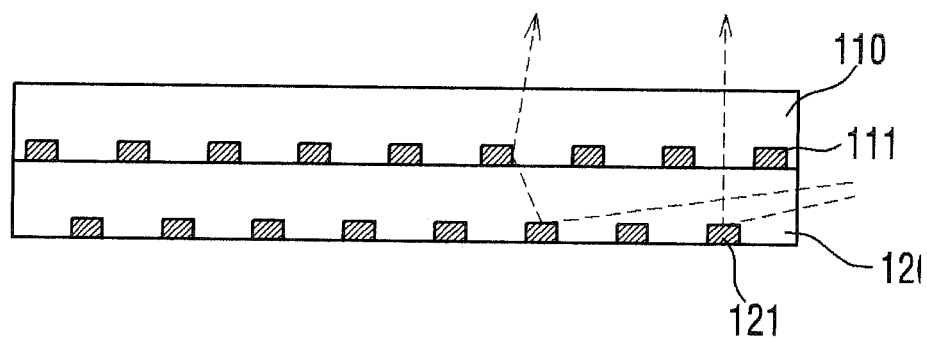
FIG. 7 is a view showing a pattern arrangement of a light guide plate according to the embodiment of the present invention.
Figure 8:
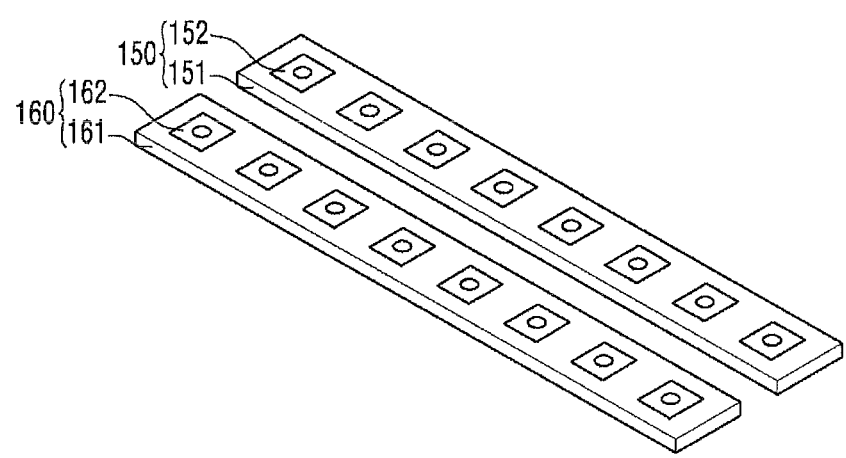
FIG. 8 is a view showing a light source unit of the light source device according to the embodiment of the present invention.

FIG. 6 is a perspective view showing another light source device according to an embodiment of the present invention. FIG. 7 is a view showing a pattern arrangement of a light guide plate according to the embodiment of the present invention. FIG. 8 is a view showing a light source unit of the light source device according to the embodiment of the present invention.

Referring to FIG. 6, a light source device 100 includes a first light guide plate 110, a second light guide plate 120, a reflector 130, a first light source unit 150, a second light source unit 160, a first photo luminescent film 170 and a second photo luminescent film 180.

The first light guide plate 110 and the second light guide plate 120 convert a point light source into a surface light source. A first pattern 111 and a second pattern 121 are formed on one sides of the light guide plate 110 and the second light guide plate 120 respectively such that light internally incident is emitted to the outside.

The first light guide plate 110 is stacked on the second light guide plate 120. The first pattern 111 and the second pattern 121, which are formed in the first light guide plate 110 and the second light guide plate 120 respectively, function to diffuse or scatter the light and to emit to the outside.

As shown in FIG. 7, the first pattern 111 and the second pattern 121 may be disposed such that they are superposed on each other or overlapped with each other. However, it is preferable that the first pattern 111 and the second pattern 121 are formed not to be overlapped with each other on one sides of the first light guide plate 110 and the second light guide plate 120 respectively.

The first pattern 111 and the second pattern 121 are formed in such a manner mentioned above, so that the characteristic of diffusion or scatter of incident light can be improved. As a result, the optical path is reduced and luminous efficiency is enhanced.

In other words, when light is incident on the inside of the second light guide plate 120 through one side of the second light guide plate 120 at a total reflection angle, the incident light is totally reflected on the other side of the second light guide plate 120, so that the optical path becomes longer. However, when the first pattern is formed on one side of the first light guide plate 110 stacked on the second light guide plate 120, light to be totally reflected on the other side of the second light guide plate 120 is diffused or scattered at the first pattern 111 formed on one side of the first light guide plate 110. As a result, the light is directly emitted to the outside without being totally reflected. Accordingly, the optical path is effectively reduced.

The first light guide plate 110 and the second light guide plate 120 may be made of a transparent resin, and may be printed by a silk screen printing method.

A diffusing film 190 is disposed on the first light guide plate 110. The diffuser film 190 functions to allow the light incident into the insides of the light guide plate 110 and the second light guide plate 120 to be uniformly emitted to the outside.

The reflector 130 is disposed under the second light guide plate 120. The reflector 130 prevents the light incident into the inside of the first light guide plate 110 or the second light guide plate 120 from being emitted to the rears of the light guide plates.

The first light source unit 150 is disposed on the side of the first light guide plate 110. The second light source unit 160 is disposed on the side of the second light guide plate 120. Any device capable of emitting light can be used as the first light guide plate 110 and the second light guide plate 120. In the embodiment of the present invention, a light emitting diode which is one of light emitting devices is used as the light source unit.

The first light source unit 150 and the second light source unit 160 are optically coupled to the first light guide plate 110 and the second light guide plate 120 respectively, so that light generated from the first light source unit 150 is incident on the first light guide plate 110 and light generated from the second light source unit 160 is incident on the second light guide plate 120.

The first light source unit 150 and the second light source unit 160 respectively include, as shown in FIG. 8, printed circuit boards 151 and 161, and a plurality of light emitting devices 152 and 162. The plurality of light emitting devices 152 and 162 are disposed on the printed circuit boards 151 and 161 respectively. The plurality of the light emitting devices 152 and 162 are arranged in a line in the longitudinal direction of the printed circuit board. As such, a light emitting device capable of creating white light has various types according to color temperatures. As regards a plurality of light emitting devices used in the embodiment of the present invention, specifically, the plurality of the light emitting device 152 included in the first light source unit 150 are constituted by warm white LEDs and are arranged on the printed circuit board 151. The plurality of the light emitting device 162 included in the second light source unit 160 are constituted by cool white LEDs and are arranged on the printed circuit board 161.

Figure 9A:
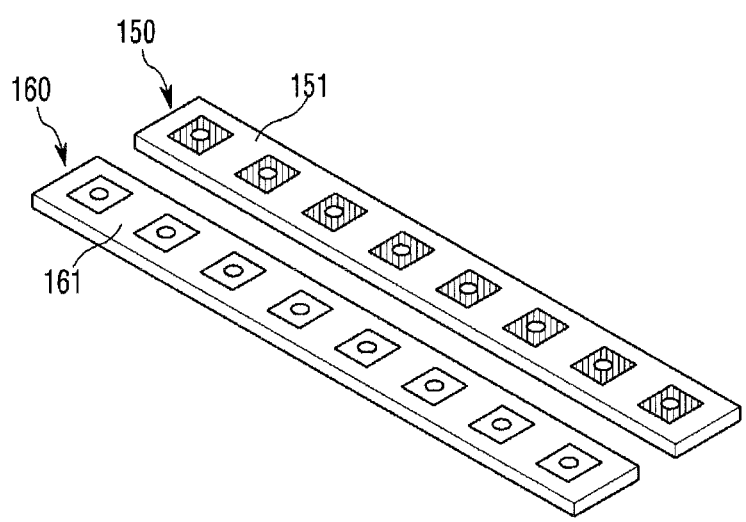
FIGS. 9a to 9c are views showing an embodiment of the present invention, that is, arrangement structures of warm white LEDs and cool white LEDs which are included in a first light source unit and a second light source unit respectively.
Figure 9B:
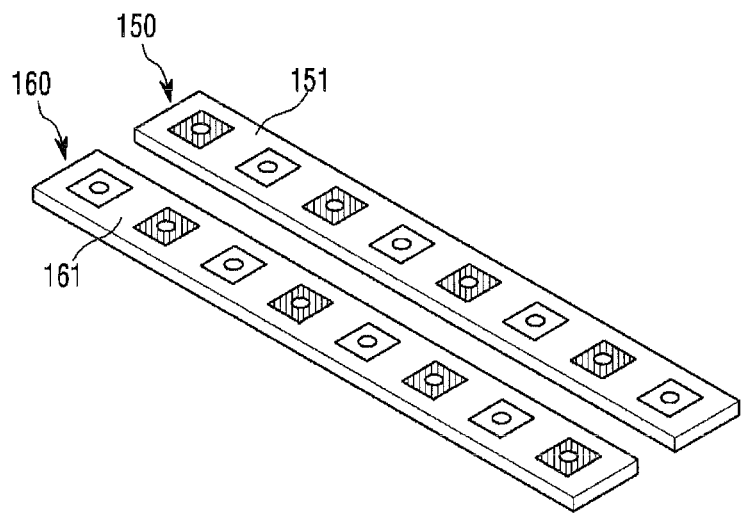
Figure 9C:
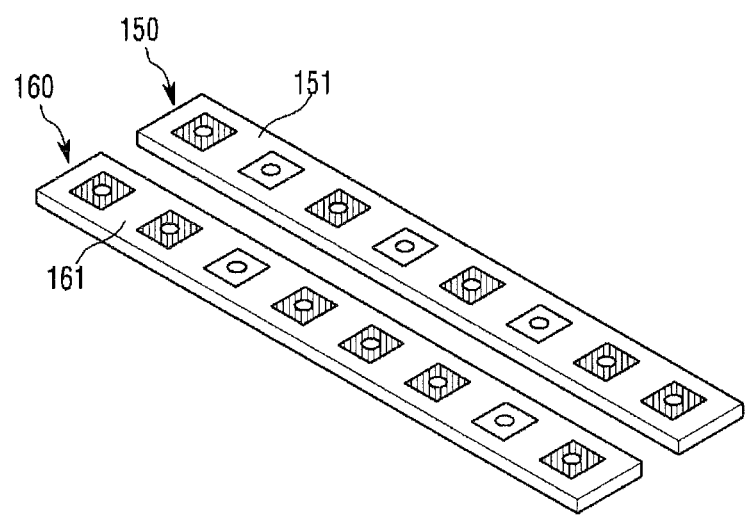

FIGS. 9a to 9c are views showing an embodiment of the present invention, that is, arrangement structures of warm white LEDs and cool white LEDs which are included in a first light source unit and a second light source unit respectively.

As shown in FIG. 9a, the warm white LEDs may be arranged in a line on the print circuit board 151 of the first light source unit 150. The cool white LEDs may be arranged in a line on the print circuit board 161 of the second light source unit 160.

Also, as shown in FIG. 9b, the warm white LEDs and the cool white LEDs are alternately arranged in a line on the printed circuit board 151 of the first light source unit 150 in a line in the longitudinal direction of the printed circuit board 151. The warm white LEDs and the cool white LEDs are also alternately arranged in a line on the printed circuit board 161 of the second light source unit 160 in a line in the longitudinal direction of the printed circuit board 161. In this case, the warm white LEDs and the cool white LEDs of the first light source unit 150 and the second light source unit 160 are arranged in a grid pattern.

As shown in FIG. 9c, the warm white LEDs and the cool white LEDs may be randomly arranged all over both the first light source unit 150 and the entire second light source unit 160.

The first photo luminescent film 170 is disposed between the first light guide plate 110 and the first light source unit 150. The second photo luminescent film 180 is disposed between the second light guide plate 120 and the second light source unit 160. The first photo luminescent film 170 and the second photo luminescent film 180 include various fluorescent materials thereinside.

The first photo luminescent film 170 changes a part of a wavelength of light emitted from the first light source unit 150, and changes the color of the light. The second photo luminescent film 180 changes a part of wavelength of light emitted from the second light source unit 160, and changes the color of the light.

Figure 10:
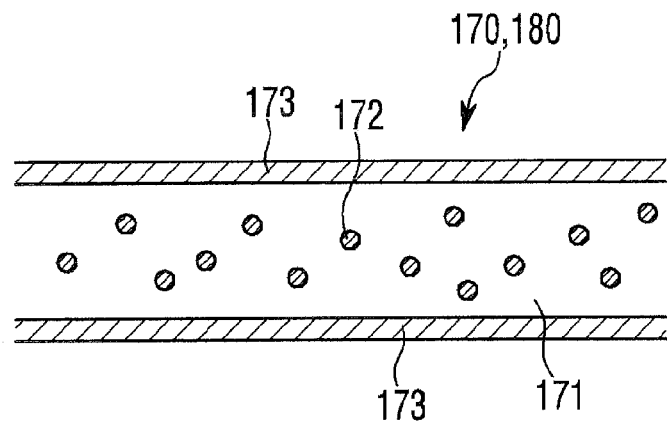
FIG. 10 is a view showing a structure of a phosphor luminescent film according to the embodiment of the present invention.

FIG. 10 is a view showing a structure of a phosphor luminescent film according to the embodiment of the present invention.

As shown in FIG. 10, the photo luminescent films 170 and 180 include a transparent resin 171 and a fluorescent material 172 included within the transparent resin 171. A transparent protective film 173 is stacked on the transparent resin. A silicon resin is mainly used as the transparent resin. Any material having transparency can be used as the transparent resin.

Since said first and second photo luminescent films 170 and 180 have been already described in FIG. 4, detailed description thereof will be omitted.

Figure 11:
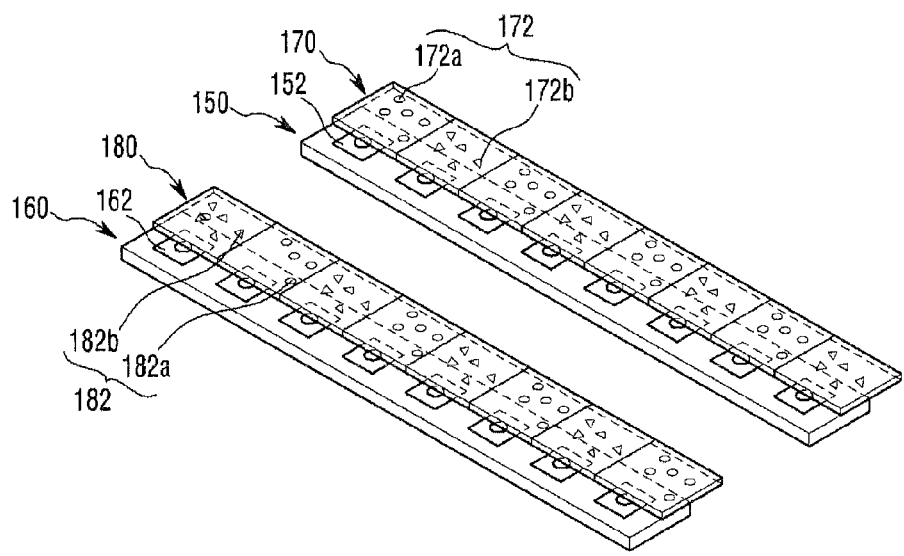
FIG. 11 is a view showing an arrangement structure of a fluorescent material included in the phosphor luminescent film according to the embodiment of the present invention and showing a structure in which the phosphor luminescent film and the light source unit are arranged.

FIG. 11 is a view showing an arrangement structure of a fluorescent material included in the phosphor luminescent film according to the embodiment of the present invention and showing a structure in which the phosphor luminescent film and the light source unit are arranged.

As shown, the first photo luminescent film 170 includes a first fluorescent material 172a and a second fluorescent material 172b different from the first fluorescent material 172a. The first fluorescent material 172a and the second fluorescent material 172b are partitioned from each other in the first photo luminescent film 170, and are alternately arranged in the longitudinal direction of the photo luminescent film 170.

In addition, the second photo luminescent film 180 includes a first fluorescent material 182a and a second fluorescent material 182b different from the first fluorescent material 182a. The first fluorescent material 182a and the second fluorescent material 182b are partitioned from each other in the second photo luminescent film 180, and are alternately arranged in the longitudinal direction of the second photo luminescent film 180. In this case, the first fluorescent materials 172a and 182a and the second fluorescent materials 182a and 182b which are included in both the first photo luminescent film 170 and the second photo luminescent film 180 are arranged in a grid pattern.

While not shown, when a desired color of light is required to be emitted or light having a specific color is required to be emitted from a particular point of the light emitting surface, the first fluorescent materials 172a and 182a and the second fluorescent materials 182a and 182b which are included in both the first photo luminescent film 170 and the second photo luminescent film 180 may be locally or randomly arranged in the longitudinal direction of the first photo luminescent film 170 and the second photo luminescent film 180.

However, when the first fluorescent materials 172a and 182a and the second fluorescent materials 182a and 182b are alternately arranged and when light is emitted to the outside through the light guide plate in the form of a surface light source, the colors of the light is more uniformly mixed. As a result, various colors of the light can be created on the entire light emitting surface.

The color of light may be created depending on the color of the light emitted from a light emitting device per se. However, it is preferable that the color of light is created depending on the fluorescent material included in the photo luminescent film.

When the first fluorescent material 172a and the second fluorescent material 172b are alternately disposed, and the first fluorescent material 182a and the second fluorescent material 182b are alternately disposed, the plurality of the light emitting devices 152 of the light source unit 150 are, as shown, disposed corresponding respectively to the first fluorescent material 172a and second fluorescent material 172b which are disposed within the photo luminescent films 170. Also, the plurality of the light emitting devices 162 of the light source unit 160 are, as shown, disposed corresponding respectively to the first fluorescent material 182a and second fluorescent material 182b which are disposed within the photo luminescent films 180. Therefore, alignment characteristic between the plurality of the light emitting devices and the fluorescent materials is satisfactory, thus emitting light having a desired color temperature.

The first fluorescent materials 172a and 182a and the second fluorescent materials 172b and 182b absorb respectively light having a specific wavelength and being emitted from the light source units 150 and 160 and convert the light into light having another wavelength. Accordingly, with respect to light emitted outward, it is possible to control the first fluorescent materials 172a and 182a and the second fluorescent materials 172b and 182b in accordance with a desired color of light.

As such, the fluorescent material included in the photo luminescent film can change the color of emitted light, thereby creating light having various colors.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, theses are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A light source device comprising:
a light guide plate;
a reflector disposed under the light guide plate;
a light source that includes a plurality of light emitting devices optically coupled to the light guide plate; and
a photo luminescent film disposed between the light guide plate and the light source, wherein the photo luminescent film includes a plurality of first partitioned areas, and a second partitioned area, wherein the plurality of first partitioned areas include a first one of the first partitioned areas and a second one of the first partitioned areas,
wherein the second partitioned area is between the first one of the first partitioned areas and the second one of the first partitioned areas,
wherein each of the plurality of first partitioned areas includes a first fluorescent material, and the second partitioned area includes a second fluorescent material,
wherein the first fluorescent material is different from the second fluorescent material,
wherein the first fluorescent material includes a yellow fluorescent material, and the second fluorescent material includes at least one of a green fluorescent material and/or a red fluorescent material,
wherein the plurality of light emitting devices are arranged in a line that extends in a first direction, wherein the first direction of the line corresponds to a longitudinal direction of an incident surface of the light guide plate,
wherein the plurality of light emitting devices includes a plurality of first blue light emitting devices (LEDs), and a second blue LED, wherein the plurality of first blue light LEDs includes a first one of the first blue LEDs and a second one of the first blue LEDs,
wherein the second blue LED is between the first one of the first blue LEDs and the second one of the first blue LEDs,
wherein the first one of the first blue LEDs is aligned with the first one of the first partitioned areas, the second blue LED is aligned with the second partitioned area, and the second one of the first blue LEDs is aligned with the second one of the first partitioned areas,
wherein the first one of the first blue LEDs and the first one of the first partitioned areas overlap in a vertical direction of the longitudinal direction,
wherein the second blue LED and the second partitioned area overlap in the vertical direction, and
wherein the second one of the first blue LEDs and the second one of the first partitioned areas overlap in the vertical direction.

2. The light source device of claim 1, wherein the plurality of light emitting devices are disposed corresponding respectively to the first fluorescent material or the second fluorescent material in an order of the first fluorescent material—the second fluorescent material—the first fluorescent material—the second fluorescent material.

3. The light source device of claim 1, wherein the plurality of the light emitting devices includes a warm-white LED and a cool-white LED.

4. The light source device of claim 3, wherein the warm-white LED emits a correlated color temperature within a range between 2,000 K and 3,000 K, and the cool-white LED emits a correlated color temperature within a range between 5,500 K and 6,500 K.

5. The light source device of claim 1, wherein the light guide plate comprises a first light guide plate that includes a first incident surface and a second light guide plate that includes a second incident surface, the first light guide plate is disposed on the second light guide plate,
wherein the light source includes a first light source unit and a second light source unit, the first light source is disposed on the second light source, the first light source is disposed on the first incident surface of the first light guide plate, the second light source is disposed on the second incident surface of the second light guide plate,
wherein the photo luminescent film includes a first photo luminescent film and a second photo luminescent film, and wherein the first photo luminescent film is disposed between the first light guide plate and the first light source unit, and the second photo luminescent film is disposed between the second light guide plate and the second light source unit.

6. The light source device of claim 5, wherein a first fluorescent material and a second fluorescent material, which are comprised in both the first photo luminescent film and the second photo luminescent film, are partitioned and randomly arranged.

7. The light source device of claim 5, wherein a first fluorescent material and a second fluorescent material, which are comprised in both the first photo luminescent film and the second photo luminescent film, are arranged in a grid pattern.

8. The light source device of claim 5, wherein the first light guide plate includes a first pattern and the second light guide plate includes a second pattern there inside in order to diffuse or scatter light, and wherein the first pattern and the second pattern are not overlapped with each other.

9. The light source device of claim 5, wherein the plurality of the light emitting devices comprised in the first light source unit are warm-white LEDs, and wherein the plurality of the light emitting devices comprised in the second light source unit are cool-white LEDs.

10. The light source device of claim 5, wherein a plurality of the light emitting devices comprised in the first light source unit correspond to a warm-white LED and a cool-white LED, wherein a plurality of the light emitting devices comprised in the second light source unit correspond to a warm-white LED and a cool white LED, wherein the warm-white LED and the cool-white LED comprised in the first light source unit are alternately arranged, and wherein the warm-white LED and the cool-white LED comprised in the second light source unit are alternately arranged.

11. The light source device of claim 1, wherein the photo luminescent film includes a transparent resin layer having a fluorescent material and the photo luminescent film includes a protective film disposed on the transparent resin layer, and wherein the transparent resin layer has a diffusing agent.

12. The light source device of claim 11, wherein the fluorescent material comprises at least one of a garnet based material, a silicate based material, a nitride based material and an oxynitride based material.

13. A light source device comprising:
a light guide plate;
a reflector disposed under the light guide plate;
a light source including a plurality of first light emitting devices and a plurality of second light emitting devices optically coupled to the light guide plate; and
a photo luminescent film disposed between the light guide plate and the light source,
wherein the first light emitting device is a warm-white light emitting device (LED) that emits a correlated color temperature within a range between 2,000 K and 3,000 K, and the second light emitting device is a cool-white LED that emits a correlated color temperature within a range between 5,500 K and 6,500 K, and wherein the warm-white LED and the cool-white LED are disposed in a longitudinal direction of the photo luminescent film,
wherein the photo luminescent film includes a plurality of first partitioned areas and a plurality of second partitioned areas,
wherein each of the first partitioned areas is between adjacent two second partitioned areas,
wherein the warm-white LED includes a first warm-white LED, a second warm-white LED and a third warm-white LED,
wherein the cool-white LED includes a first cool-white LED and a second cool-white LED,
wherein the first cool-white LED is between the first warm-white LED and the second warm-white LED,
wherein the second cool-white LED is between the second warm-white LED and the third warm-white LED,
wherein each of the first partitioned areas is aligned with one of the first warm-white LED, the second warm-white LED and the third warm-white LED,
wherein each of the second partitioned areas is aligned with one of the first cool-white LED and the second cool-white LED,
wherein the first warm-white LED and the first partitioned area overlap in a vertical direction of the longitudinal direction,
wherein the first cool-white LED and the second partitioned area overlap in the vertical direction,
wherein the second warm-white LED and the first partitioned area overlap in the vertical direction,
wherein the second cool-white LED and the second partitioned area overlap in the vertical direction,
wherein the third warm-white LED and the first partitioned area overlap in the vertical direction,
wherein the light guide plate includes a first light guide plate that includes a first incident surface and a second light guide plate that includes a second incident surface, and the first light guide plate is disposed on the second light guide plate,
wherein the light source includes a first light source and a second light source, the first light source is disposed on the second light source, the first light source is disposed on the first incident surface of the first light guide plate, and the second light source is disposed on the second incident surface of the second light guide plate, and
wherein the photo luminescent film includes a first photo luminescent film and a second photo luminescent film, and wherein the first photo luminescent film is disposed between the first light guide plate and the first light source, and the second photo luminescent film is disposed between the second light guide plate and the second light sources.

14. The light source device of claim 13, wherein a first fluorescent material and a second fluorescent material different from the first fluorescent material are partitioned and are randomly arranged in the photo luminescent film in the longitudinal direction of the photo luminescent film.

15. The light source device of claim 14, wherein the first fluorescent material and the second fluorescent material are alternately arranged in the longitudinal direction of the photo luminescent film.

16. A light source device comprising:
- a light guide plate;
- a light source including a plurality of first light emitting devices, and a second light emitting device optically coupled to the light guide plate, wherein the plurality of first light emitting devices includes a first one of the first light emitting devices and a second one of the first light emitting devices; and
- a photo luminescent film disposed between the light guide plate and the light source,
- wherein the plurality of first light emitting devices have a warm-white light emitting device (LED), and the second light emitting device has a cool-white LED,
- wherein the photo luminescent film includes a plurality of first partitioned areas, and a second partitioned area, wherein the plurality of first partitioned areas includes a first one of the first partitioned areas and a second one of the first portioned areas,
- wherein each of the plurality of first partitioned areas comprises a first fluorescent material,
- wherein the second partitioned area comprises a second fluorescent material different from the first fluorescent material,
- wherein the second partitioned area is disposed between the first one of the first partitioned areas and the second one of the first partitioned areas,
- wherein the first one of the first partitioned areas is aligned with the first one of the first light emitting devices,
- wherein the second partitioned area is aligned with the second light emitting device,
- wherein the second one of the first partitioned areas is aligned with the second one of the first light emitting devices,
- wherein the first one of the first light emitting devices and the first one of the first partitioned areas overlap in a vertical direction of a longitudinal direction of an incident surface of the light guide plate,
- wherein the second light emitting device and the second partitioned area overlap in the vertical direction, and
- wherein the second one of the first light emitting devices and the second one of the first partitioned areas overlap in the vertical direction.

17. The light source device of claim 16, wherein the plurality of first light emitting devices emit a correlated color temperature within a range between 2,000 K and 3,000 K, and wherein the second light emitting device emits a correlated color temperature within a range between 5,500 K and 6,500 K.

* * * * *